United States Patent [19]

Kriege

[11] Patent Number: 5,408,572
[45] Date of Patent: Apr. 18, 1995

[54] LIGHT-EMITTING UNIT FOR OPTICAL FIBER LIGHTGUIDES

[75] Inventor: Wolfgang Kriege, Mainz, Germany

[73] Assignee: Schott Glaswerke, Mainz, Germany

[21] Appl. No.: 243,660

[22] Filed: May 17, 1994

Related U.S. Application Data

[63] Continuation-in-part of Ser. No. 99,497, Jul. 30, 1993, abandoned.

[30] Foreign Application Priority Data

Jul. 31, 1992 [DE] Germany .................. 42 25 323.3

[51] Int. Cl.[6] .................................................. G02B 6/26
[52] U.S. Cl. .................................... 385/43; 385/33; 385/121; 385/901
[58] Field of Search ................... 385/43, 901, 15, 31, 385/33, 36, 146, 115, 120, 121; 359/833

[56] References Cited

U.S. PATENT DOCUMENTS

| | | | |
|---|---|---|---|
| 3,941,485 | 3/1976 | Madden | 385/901 |
| 4,611,885 | 9/1986 | Boirat | 385/43 |
| 5,101,466 | 3/1992 | Reidinger | 385/901 |

FOREIGN PATENT DOCUMENTS

| | | |
|---|---|---|
| 0143856 | 6/1985 | European Pat. Off. . |
| 2488709 | 2/1992 | France . |
| 63-269106 | 11/1988 | Japan .................... 385/43 |
| 2162335 | 1/1986 | United Kingdom . |
| WO87/00907 | 2/1987 | WIPO . |

Primary Examiner—Rodney B. Bovernick
Assistant Examiner—John Ngo
Attorney, Agent, or Firm—Millen, White, Zelano, & Branigan

[57] ABSTRACT

A light-emitting unit is disclosed for optical fiber lightguides. The unit is especially useful for a signal display device for the display of traffic signals. The unit exhibits light fed by way of lightguides to a raster dot in the display area, a light entrance end for connection with the feeding end of the associated lightguide, and a light exit end forming, in the display area, the light exit surface of the raster dot. The unit includes a light-guiding central zone between the light entrance and light exit ends. This zone flares toward the light exit end substantially in a conical or pyramidal fashion. The light-emitting unit according to this invention is distinguished in that a tapering extension section is provided for obtaining a wider emission angle with a uniform, high light intensity over the entire angular range at the light exit end.

5 Claims, 2 Drawing Sheets

LIGHT-EMITTING UNIT FOR OPTICAL FIBER LIGHTGUIDES

CROSS-REFERENCE TO RELATED APPLICATION

This application is a continuation-in-part of U.S. patent application Ser. No. 08/099,497 filed Jul. 30, 1993, now abandoned.

BACKGROUND OF THE INVENTION

The invention relates to a light-emitting unit for optical fiber lightguides, especially for signal display devices to display traffic signals, this unit exhibiting, for emitting the light transmitted to a raster dot in the display area by way of lightguides, a light entrance end for connection with the feed end of the associated lightguide, and a light exit end constituting in the display area the light exit surface of the raster dot, as well as a lightguiding central zone between the light entrance and light exit ends, this zone flaring toward the light exit end in the a substantially conical or pyramidal fashion.

Such light-emitting units have been known, for example, from DE 24 37 580 C2, incorporated herein by reference. DE 24 37 580 C2 discloses fiber-optic signal display devices for the emission of light signals, especially traffic signals, wherein the symbol to be displayed is composed of a plurality of light dots in the raster screen of a display area. The illumination of the light dots takes place by means of one or several multi-arm lightguides combined in a bundle shape at one of their ends for simultaneous and joint illumination by means of a light source, the light guides terminating at their other ends into the corresponding apertures of the raster screen. According to DE 24 37 580 C2, these apertures contain light-emitting units consisting of an optically transparent material and exhibiting essentially the shape of truncated cones. The units are arranged in the apertures in such a way that their basal planes form the light-emitting areas of the raster dots in the display area whereas their section planes on the rear side of the raster screen serve for optical coupling to the respectively associated lightguides.

According to DE 24 37 580 C2, the use of substantially truncated, cone-shaped, light-emitting units have the advantage that the radiation characteristic of the light from the individual raster dots is improved to the effect that the radiated light is not only more strongly focused, thus providing a higher luminous density in the direction toward the observer, but moreover the diameter of an individual raster dot is enlarged in comparison with the diameter of the feeding lightguide so that the dot can be more readily perceived by the observer. As a result, a strong luminosity and a high sharpness of contours of the radiated light signals are obtained, which is to lead to a still satisfactory visibility of the signals even in adverse weather conditions, according to the reference.

The emission characteristic of the known lightguide unit is determined essentially by the geometry, i.e., the dimensions of the truncated cone. In any event, the emission cone, however, is not a strictly delineated form but rather exhibits a relatively soft transition toward the rim. The angular energy distribution, plotted in cartesian coordinates, resembles a Gaussian curve rather than a rectangular function.

When installing the conventional signal systems on multiple-lane freeways as well as alongside the road, it is desirable for the emission angle to be wider than required for purely individual track signaling on freeways. However, the disclosed systems have the drawback that the axial light intensity is over-proportionately reduced with increasing emission angle. Thus, for example, with a widening of the emission angle from 6 to 12, the axial light intensity is reduced to 25% of its original value.

SUMMARY OF THE INVENTION

It is an object of the invention to further develop a light-emitting unit of the type discussed hereinabove, while retaining its known advantages, in such a way that an increase in the emission angle is obtained with a uniformly high light intensity over the entire angular range.

It has been found surprisingly that, by means of a tapering extension section at the exit end of the known light-emitting unit, there is not only obtained the desired widening of the emission angle but also a high light intensity, uniform over the entire effective angular range, with a steep drop of the light intensity toward larger angles. This result i unexpected, in particular, for the reason that usually outwardly tapering exit ends are utilized in lightguides in case of focusing the transmitted light in the vicinity which leads perforce to a divergence of the light beams in the remote area.

The central zone of the light-emitting unit wherein the light is conducted from the entrance to the exit end flares substantially in a conical or pyramidal fashion toward the exit end. This means that the effect according to this invention is not only attained by the preferred truncatedcone shape of the central zone, but also by other geometrical configurations approaching a truncated-cone shape, such as, for example, a truncated pyramid with a regular or irregular polygon as the basal plane, a truncated cone with a round section plane but with a basal plane of any desired form, for example for obtaining a desired asymmetry in the angular distribution of the radiation, inter alia. The latter may be desirable if it is intended to achieve an angular distribution of the emitted light which is not rotationally symmetrical. This can be the case, for example, if, in a signal display device according to this invention, the emission angle is to be relatively broad in the horizontal direction while it is to remain restricted to the eye level of an observer in the vertical direction whereby light losses in the upward and downward directions are to be avoided. In such a case, the cross-sectional area at the light exit end of the central zone must exhibit a larger diameter in the vertical direction than in the horizontal direction. The geometrical configuration can herein be adapted, in its details, entirely to the requirements such as, for example, the subdivision of the raster screen for the signal display. The shape of the basal plane of the adjoining extension section is to be adapted correspondingly.

Furthermore, the term "substantially" is also to include in this invention bodies the shape of which deviates to a slight extent from the mathematically exact truncated-cone or truncated-pyramid configuration, on account of manufacturing conditions.

The invention nowise encompasses units as known from DE-OS 2 240 780. DE-OS 2 240 780 concerns a light-emitting cell for optical fiber lightguides consisting of a solid paraboloid of revolution made of an optically permeable material, the ends of the entering fiber lightguides being attached, e.g., cast into the focal point of this paraboloid, and the surface of the latter acting as a total reflector. Such a design results in an unfavorable luminous density distribution since an undesirable peak in luminous density occurs in the proximity of the optical axis; as can be seen from FIGS. 2 and 3 of DE-OS 2,240,780, attempts have been made to reduce such peak by a diffusion plate or lens. This drawback cannot be overcome, either, by an outwardly tapering extension section at the exit end of the light-emitting cell.

The best emission characteristic along the above lines is obtained with a light-emitting unit according to this invention exhibiting a truncated-cone-shaped central zone followed by a conically tapering extension section. However, in addition thereto, other embodiments are possible wherein the extension section represents a pyramid, a truncated cone or truncated pyramid, or a similar configuration. Surprisingly, the effect according to this invention cannot be achieved with an extension section having the shape of a planar-convex lens as illustrated in FIG. 3 of DE-OS 2 240 780.

The light-emitting unit according to the invention consists of an optically transparent material, such as, for example, glass or a synthetic resin. Preferably, the unit consists of plastic and is manufactured in one piece by means of an injection-molding process.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
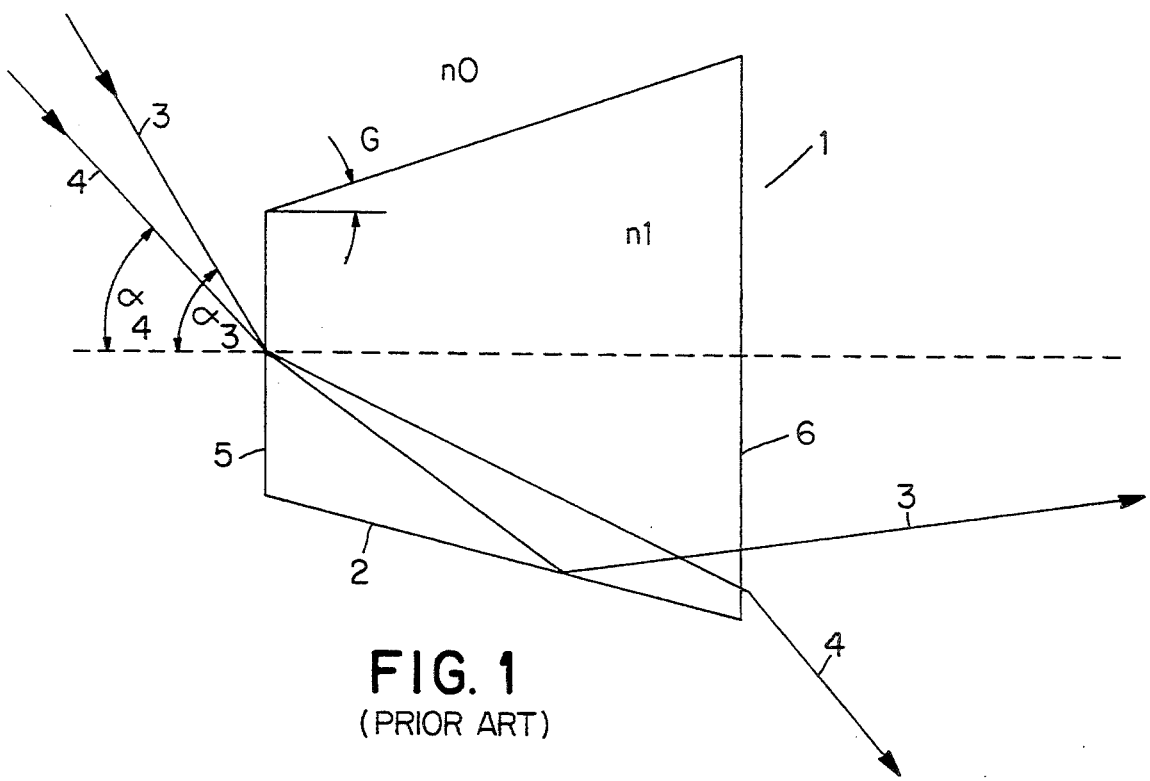
FIG. 1 shows, in a schematic longitudinal section, a light-emitting unit as known from the prior art, designed as a truncated cone with a planar light-emitting surface.

FIG. 1 depicts a conventional light-emitting unit (1) fashioned as a truncated cone. The light-emitting unit consists of an optically transparent material, for example of glass or synthetic resin, and has a refractive index $n_1$ which must be higher than the refractive index $n_0$ of the surrounding medium in order to effect total reflection of the light beams impinging from the inside onto the outer surface (2) of the truncated cone. Light rays (3) and (4) can be seen in FIG. 1, impinging, for example, from a lightguide onto the section plane (5) of the truncated cone at angles $\alpha_3$ and $\alpha_4$ to the surface normal. The light ray (3) is reflected on the outer surface (2) of the truncated cone and leaves the light-emitting surface (6) almost in parallel to the optical axis of the unit. The light ray (4), in contrast thereto, impinges on the section plane under a smaller angle, i.e., $\alpha_4 < \alpha_3$, and is refracted toward the axis to such an extent that it exits through the light-emitting surface (6) again from the light-emitting unit (1) without reflection on the outer surface. Due to the fact that the light ray (4) experiences, caused by the light-emitting unit (1), merely a parallel shift rather than a change in direction, the ray leaves the light-emitting surface (6) under large angles and contributes toward the shallow drop of the light intensity distribution curve toward large angles.

In contrast thereto, light rays which, as the light ray (3), impinge on the section plane (5) at an angle large enough for the ray to be reflected on the outer surface (2) are parallelized and/or bundled whereby the aforementioned increase in luminous density is obtained with a simultaneous increase in light-emitting area.

Figure 2:
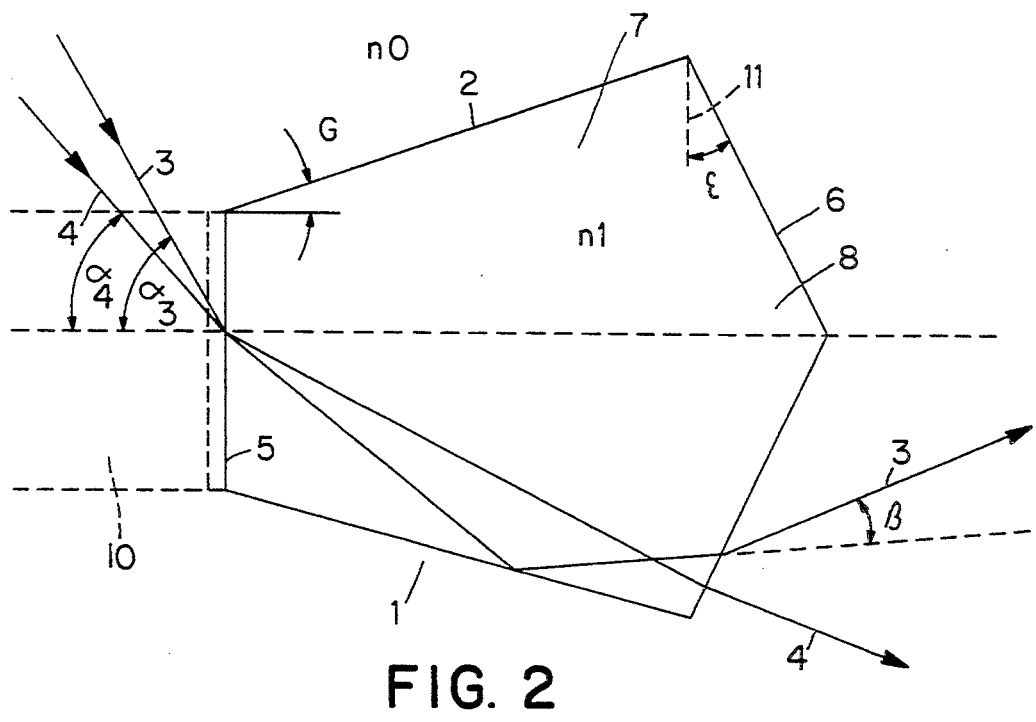
FIG. 2 shows, in the same manner of illustration, a light-emitting unit according to this invention as per a preferred embodiment with a truncated, cone-shaped, central zone and a conical, extension section.

FIG. 2 shows a light-emitting unit according to this invention. The light-emitting unit (1) is composed of a truncated, cone-shaped area or frustoconical portion (7) wherein the light is guided from the light entrance end with the section plane (5) to the light exit end with the extension portion which is in the form of a right cone (8), and of the conical extension section (8). As in FIG. 1, light rays (3) and (4) impinge under angles $\alpha_3$, $\alpha_4$ onto the section plane (5) of the light-emitting unit (1). Light ray (3) experiences a total reflection at the outer surface (2) of the truncated cone (7) and a further deflection in the direction toward the axis at the light exit surface (6) formed by the shell surface of the attached cone. Light ray (4), hitting the section plane (5) under such a small angle to the surface normal that it passes unhindered through the truncated cone, impinges at a very small angle with respect to the surface normal onto the presently inclined light exit surface (6) and thereby also incurs an only minor directional change after exiting from the light-emitting unit away from the axis. It can be seen from this example that, with a light-emitting unit according to this invention, also those rays are transmitted to the effective angular range which are radiated into the ineffective marginal zones in case of a light-emitting unit according to the state of the art.

As known from the prior art, the reflection surface, i.e., the shell surface (2) of the truncated cone, can be protected by coating with a layer of a material having a lower index of refraction.

It is self-evident that the emission characteristic of a light-emitting unit according to the invention is essentially determined by its geometry, i.e., its dimensions and angles, as well as by the emission characteristic of the feeding lightguide and the geometrical arrangement of lightguide and light-emitting unit relatively to each other. The geometry which best meets the respective requirements can be calculated most simply, on account of the complexity of the influential variables, by means of a single-ray integration or can be found by simple routine experiments.

In a practical example, the measurements of the light intensity distributions in dependence on the emission angle are indicated for a light-emitting unit according to the state of the art and a light-emitting unit in accordance with this invention. Dimensions were chosen for the light-emitting units as customary for the most important usage, namely in a signal display device for traffic signals.

The dimensions of the light-emitting unit according to the state of the art were as follows:

| | |
|---|---|
| Diameter of light entrance surface: | 1.5 mm |
| Diameter of light exit surface: | 4.0 mm |
| Length of light-emitting unit: | 18.5 mm |

The dimensions of the light-emitting unit according to the invention were as follows:

| | |
|---|---|
| Diameter of light entrance surface: | 1.5 mm |
| Diameter of light exit surface: | 4.0 mm |
| Length of light-emitting unit: | 18.5 mm |
| Base angle $\epsilon$ of light exit surface: | 8.5° |

The angular distribution of the light in the entrance plane was the same for both light-emitting units (half width of the light ray cone about ±20°).

Figure 3:
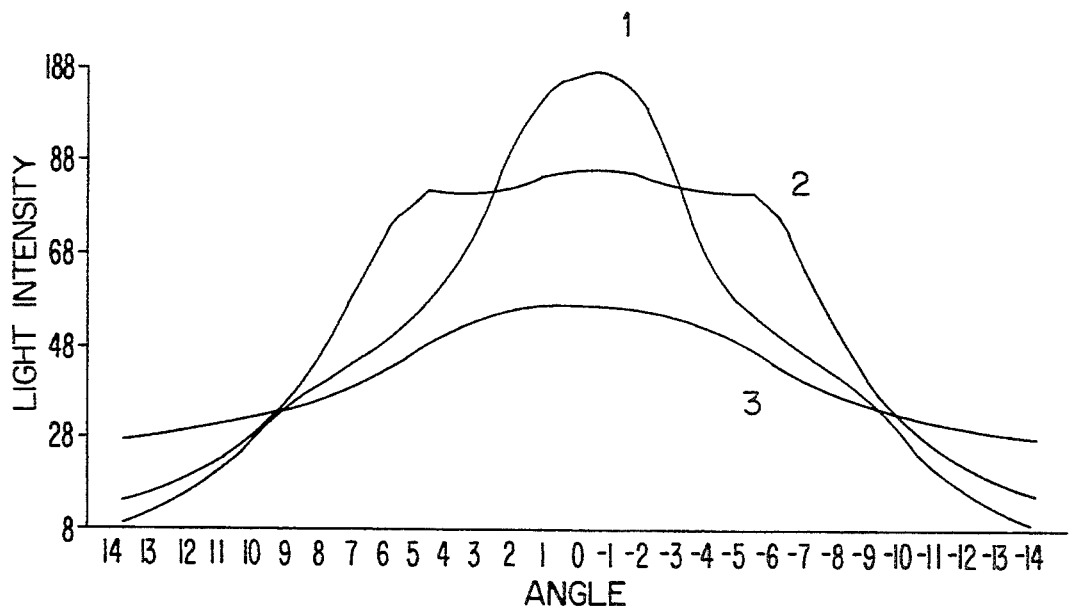
FIG. 3 shows a diagram for clarifying the improvement in emission characteristic by the invention wherein the light intensity distribution is plotted for a known light-emitting unit and a light-emitting unit according to the invention over the emission angle.

FIG. 3 shows the measured light intensity distribution curves. Numeral (1) denotes the light intensity distribution of the light-emitting unit according to the prior art, numeral (2) denotes that of the light-emitting unit according to this invention. It can be seen that the light intensity distribution curve of the known light-emitting unit is similar to a Gaussian distribution with shallowly dropping flanks, the maximum of the light intensity extending over a very narrow angular range of merely ±3°. Such a light intensity distribution is desirable, for example, in case of a light-emitting unit for a signal display device for traffic signals serving for a mere lane signalization on the freeway.

The light intensity distribution curve of the light-emitting unit according to this invention is distinguished, in contrast thereto, by a high uniform light intensity over an angular range of ±6°. The flanks of the curve drop steeply down almost to zero. From this results a high light intensity over a wider angular range whereby the light-emitting unit according to this invention is suitable especially for signal display devices for traffic signals intended for multilane freeways or in case of installations alongside the road.

For purposes of comparison, FIG. 3 additionally shows a light intensity distribution (3) determined for a light-emitting unit according to the state of the art with the proviso that this unit is to have the same half width as the light intensity distribution curve (2) of the light-emitting unit according to the invention. The data of this conventional light-emitting unit are as follows:

| | |
|---|---|
| Diameter of light entrance surface: | 1.5 mm |
| Diameter of light exit surface: | 4.0 mm |
| Length of light-emitting unit: | 10 mm |

The strop drop in light intensity in the proximity of the axis, caused by the widening of the emission angle, and the very shallowly ending flanks of the curve are clearly apparent. Such a light intensity distribution leads to a poor recognizability by the observer and distributes light into angular zones no longer utilized by the observer.

The following relationships between entrance angle and exit angle can form the basis for the meridional rays in calculations of the light intensity distributions:

1. Ray without reflection on the outer surface of the truncated cone
   1.1. Truncated cone with planar exit surface $\beta = \alpha$
   1.2. Truncated cone with conical exit surface $\beta = \epsilon -$ arcsin $(n_1/n_0 * \sin(\epsilon - \sin(n_0 * \sin\alpha/n_1)))$
2. Rays with reflection on the outer surface of the truncated cone
   2.1. Truncated cone with planar exit surface $\beta = \arcsin(n_1/n_0 * \sin(2*\sigma - \arcsin(n_0 * \sin \alpha/n_1)))$
   2.2. Truncated cone with conical exit surface $\beta = \epsilon - \arcsin(n_1/n_0 * \sin(\epsilon - (2*\sigma - \arcsin(n_0 * \sin \alpha/n_1)))$ In the formulae:
$\beta$ = exit angle
$\alpha$ = entrance angle
$\epsilon$ = base angle of the cone of the exit surface
$n_1$ = refractive index of cone material
$n_0$ = refractive index of surrounding medium
$\sigma$ = angle of truncated cone toward system axis Since, in the mode of operation of such a cone system, it is not only the meridional rays but also all other rays which have a substantial share therein, the calculation of such a system, considering the parameters that influence the system, can only be performed with complicated computer programs by effecting a ray integration with statistical means.

Figure 4:
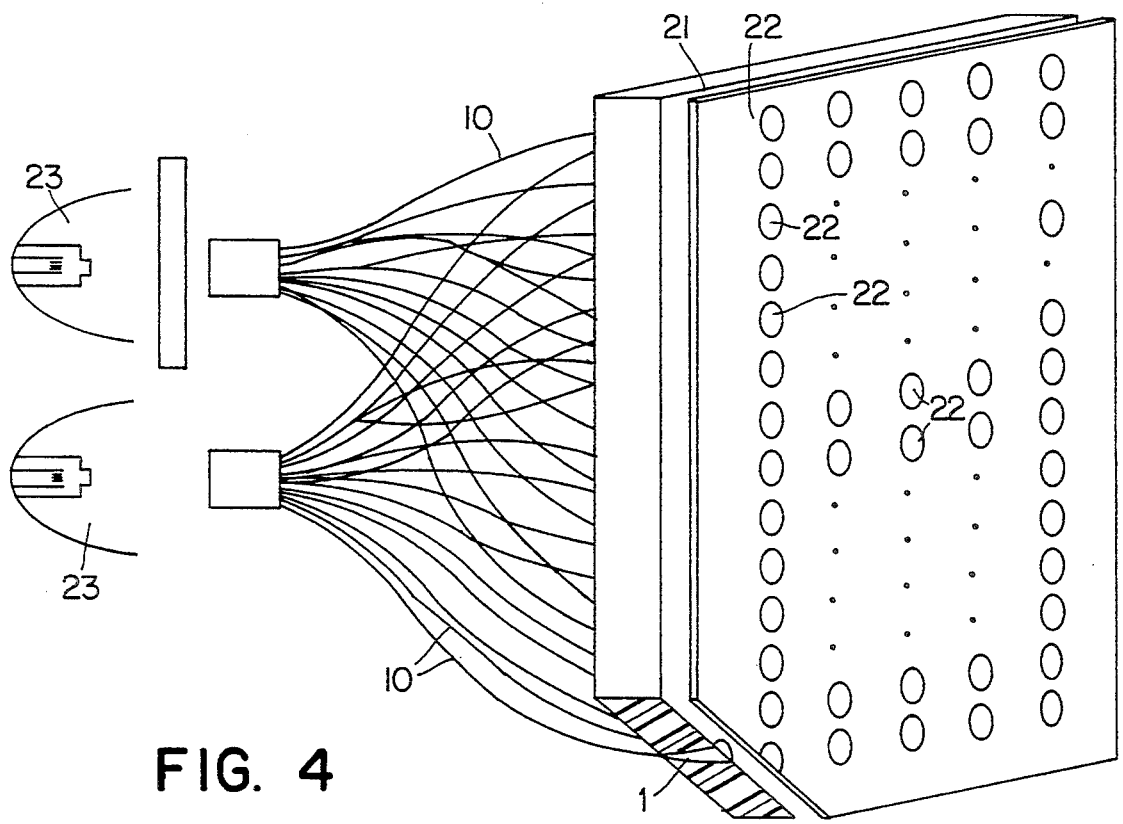
FIG. 4 is a perspective view of a plurality of light emitting units such as those of FIG. 2 incorporated into a display such as a traffic signal.

In summary, the fiber optic signal display devices provide for presenting symbols as light signals wherein the signals are used in the displays of traffic lights. The symbols displayed are composed of a plurality of light dots 20 in the raster screen 21 of a display area 22 of the traffic light such as is seen in FIG. 4. The light dots are formed at the exit end of the light-emitting units 10 which are each optically connected to a fiber optic lightguide at one end and are inserted at the other end into the apertures of the raster screen 22. As is set forth in DE 24 37 580 C2, incorporated herein by reference, the other end of the fiber optic light guides 10 are illuminated by light sources 23. In accordance with the improvement, a conical projecting portion 8 extends from the frustoconical portion 2. The frustoconical portion 2 has a narrow base 5 aligned with the fiber optical guide 10. The frustoconical section 2 expands from the narrow base 5 to a unitary junction 11 with the conical projecting portion 8, the conical projecting portion having a light-emitting end surface 6.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fiber-optic signal display device presenting symbols as light signals useful in traffic lights, wherein said symbols are composed of a plurality of light dots in a raster screen of a display area of the device,
   the light dots being formed at the exit ends of light-emitting units which are each optically connected to a fiber optic lightguide at one end and are inserted at the other end into one aperture of the raster screen, the improvement comprising: configuring each light-emitting unit with a conical projecting portion (8) extending from a frustoconical portion (2); the frustoconical portion having a narrow base (5) aligned with the fiber optical guide, the frustoconical section (2) expanding from the narrow base to a juncture (11) with the conical projecting portion, the conical projecting portion having a light-emitting end surface (6).

2. The improvement of claim 1, wherein the conical projecting portion is a right cone coaxial with the axis of the frustoconical portion.

3. The improvement of claim 2, wherein the light-emitting unit is made of synthetic resin.

4. The improvement of claim 3, wherein the frustoconical portion and cone portion are unitary.

5. The improvement of claim 1, wherein the frustoconical portion and cone portion are unitary.

* * * * *